| United States Patent [19] | [11] Patent Number: 4,981,676 |
| Minet et al. | [45] Date of Patent: Jan. 1, 1991 |

[54] CATALYTIC CERAMIC MEMBRANE STEAM/HYDROCARBON REFORMER

[76] Inventors: Ronald G. Minet, 592 Garfield Ave., South Pasadena, Calif. 91030; Theodore T. Tsotsis, 16312 Angler La., Huntington Beach, Calif. 92647

[21] Appl. No.: 434,267

[22] Filed: Nov. 13, 1989

[51] Int. Cl.$^5$ .......................... C01B 3/26; C01B 3/56
[52] U.S. Cl. ..................... 423/652; 423/248; 423/451; 252/373; 55/16; 55/158
[58] Field of Search ............... 423/651, 652; 55/16, 55/158; 252/373

[56] References Cited

U.S. PATENT DOCUMENTS

| 3,923,466 | 12/1975 | Seelig et al. | 252/373 |
| 3,940,285 | 2/1976 | Nickols, Jr. et al. | 429/39 |
| 4,213,954 | 7/1980 | Pinto | 423/361 |
| 4,298,588 | 11/1981 | Pinto | 423/362 |
| 4,329,157 | 5/1982 | Dobo et al. | 55/16 |
| 4,592,903 | 6/1986 | Osman et al. | 423/362 |
| 4,618,451 | 10/1986 | Gent | 252/373 |
| 4,620,914 | 11/1986 | Abens et al. | 204/278 |
| 4,713,234 | 12/1987 | Weirich et al. | 423/652 |

*Primary Examiner*—Anthony McFarlane
*Attorney, Agent, or Firm*—William W. Haefliger

[57] ABSTRACT

A diffusion process for steam reforming of a hydrocarbon to produce $H_2$, CO and $CO_2$, that includes: providing a generally tubular, porous, ceramic membrane, and providing a heated reaction zone in a container into which the membrane is received; the membrane carrying a catalytically active metallic substance; passing a hydrocarbon and steam containing first fluid stream into the zone and into contact with one side of the membrane, to produce CO, $CO_2$ and $H_2$; and passing a second fluid stream adjacent the opposite side of the membrane in such manner as to promote hydrogen diffusion through the membrane from said one side to said opposite side thereof; and removing hydrogen from the opposite side of the membrane.

14 Claims, 2 Drawing Sheets

CATALYTIC CERAMIC MEMBRANE STEAM/HYDROCARBON REFORMER

BACKGROUND OF THE INVENTION

This invention relates generally to steam reformation of hydrocarbon, and more particularly to process and apparatus employing a porous ceramic reactor tube or tubes to achieve economic advantages.

The commercial application of steam reforming of hydrocarbons for the production of hydrogen, ammonia, methanol, and other products involves the catalytic reaction of a hydrocarbon feedstock with steam to form a mixture of hydrogen, carbon monoxide, carbon dioxide, water vapor, and residual hydrocarbons.

The reaction between methane and steam to produce hydrogen as well as carbon monoxide and carbon dioxide is a well-known chemical process which proceeds in accordance with the following chemical equations:

$$CH_4 + H_2O \rightarrow CO + 3H_2 \quad (1)$$

$$CH_4 + 2H_2O \rightarrow CO_2 + 4H_2 \quad (2)$$

The water gas shift reaction is also involved as follows:

$$CO + H_2O \rightarrow CO_2 + H_2 \quad (3)$$

All of the foregoing reactions are favored by the presence of appropriate catalytic materials. In the case of equations (1) and (2), the normal catalyst is nickel deposited on alumina support materials.

Reactions (1) and (2) are endothermic and require the rapid input of heat at high temperatures to cause the reaction to take place at an economic rate. Typically, the steam methane reformer is a furnace with multiple high temperature alloy tubes filled with nickel-impregnated carrier material, pelleted catalyst. Temperatures in the range of 700° to 880° C. are required to cause the system to reach equilibrium conversion levels for methane in the range of 90+ %. Some data giving typical equilibrium compositions of reformed methane as a function of the temperature are given in:

TABLE 1

NORMAL EQUILIBRIUM COMPOSITION FOR METHANE STEAM REFORMING LOWER TEMPERATURE RANGE VOLUME %

| Component | \multicolumn{6}{c}{Temperature °C.} |
|---|---|---|---|---|---|---|
|  | 350 | 403 | 463 | 524 | 584 | 664 |
| $CH_4$ | 16.9 | 16.1 | 14.7 | 12.8 | 10.4 | 6.7 |
| $CO_2$ | 0.9 | 1.5 | 2.5 | 3.7 | 5.1 | 6.3 |
| CO | — | — | — | 0.1 | 0.6 | 2.1 |
| $H_2$ | 3.6 | 6.1 | 10.2 | 15.7 | 22.2 | 31.6 |
| $H_2O$ | 78.5 | 76.3 | 72.6 | 67.7 | 61.7 | 53.3 |

Catalytic steam reformer furnaces are conventially generally were limited to pressures less than about 500 psi at design temperatures of about 1,750° F. (935° C.), and with a mechanical limitation of about one-inch thickness for cast, high alloy steel tubes. Such tubes were required to be long, i.e., about ten meters, in commercial installation. There is need for an improved process and apparatus, and particularly a process making it possible to operate at lower temperatures and possibly pressure, enabling "once through" operation for high pressure hydrogen requirements as in methanol and ammonia plants, as well as hydrocracking.

SUMMARY OF THE INVENTION

It is a major object of the invention to provide a process, and apparatus, meeting the above need, as well as permitting lower temperature reforming by hydrocarbons at high conversion levels. In particular, it is a major object to provide a significantly improved process, wherein a high temperature catalytic ceramic membrane is employed to permit the hydrogen generated by the reaction to permeate out of the reaction zone as it is formed allowing the conversion of methane (and other hydrocarbons) to hydrogen to proceed more than to 90+ % even at low temperatures (of the order of 300° to 600° C.). This is in accordance with the standard equilibrium constant equations:

$$K_{p1} = \frac{[CO][H_2]^3}{[CH_4][H_2O]} \quad (4)$$

$$K_{p2} = \frac{[CO_2][H_2]^4}{[CH_4][H_2O]} \quad (5)$$

As the hydrogen is removed from the reaction zone, the equilibrium equation requires the conversion of more methane to satisfy the relationship. If all hydrogen produced is removed from the reaction zone, the equilibrium equation requires the conversion of more methane to satisfy the relationship. If all hydrogen produced remains in the reaction zone, the equilibrium conversion level at 600° C. and 300 psig is only 27%; and at 650° C., it is only 36%.

If the hydrogen produced is permeated out of the reaction zone by an appropriate differential pressure across the catalytic membrane, the equilibrium equation will be satisfied by the conversion of methane until it is consumed.

Accordingly, it is another object of the invention to provide an improved process that employs the following steps:

(a) providing a generally tubular, porous, ceramic membrane, and providing a heated reaction zone in a container into which the membrane is received, (b) the membrane carrying a catalytically active metallic substance, (c) passing a hydrocarbon and steam containing first fluid stream into the reaction zone and into contact with one side of the membrane, and to produce $CO_2$ and $H_2$, (d) and passing a steam containing second fluid stream adjacent the opposite side of the membrane in such manner as to promote hydrogen diffusion through the membrane from said one side to said opposite side thereof, (e) and removing hydrogen from the opposite side of the membrane.

As will later be seen, the reformed hydrogen is removed from the reaction zone, downstream and along the length of the ceramic tube, from the point of introduction of the hydrogen to that zone. Typically, the orientation relative to the ceramic tube is such that (i) the first stream is introduced to the zone at a point A along the length of the membrane, (ii) the second stream is introduced into a region surrounded by the membrane at a point B along the length of the membrane, (iii) the hydrogen is removed from the region at a point C along the length of the membrane, (iv) and the CO, $CO_2$ and $H_2O$ are removed from the reaction zone at a point D along the length of the membrane.

In this regard, points C and D are spaced along the length of the ceramic tube from points A and B.

Banks of such tubes and metallic containers therefor, may be employed in a furnace, as will later be seen.

These and other objects and advantages of the invention, as well as the details of an illustrative embodiment, will be more fully understood from the following specification and drawings, in which:

DRAWING DESCRIPTION

FIG. 1 is an elevation showing one form of apparatus performing the process; and FIG. 2 is an elevation showing a furnace employing multiple such devices as are shown in FIG. 1, together with associated process steps.

DETAILED DESCRIPTION

Figure 1:
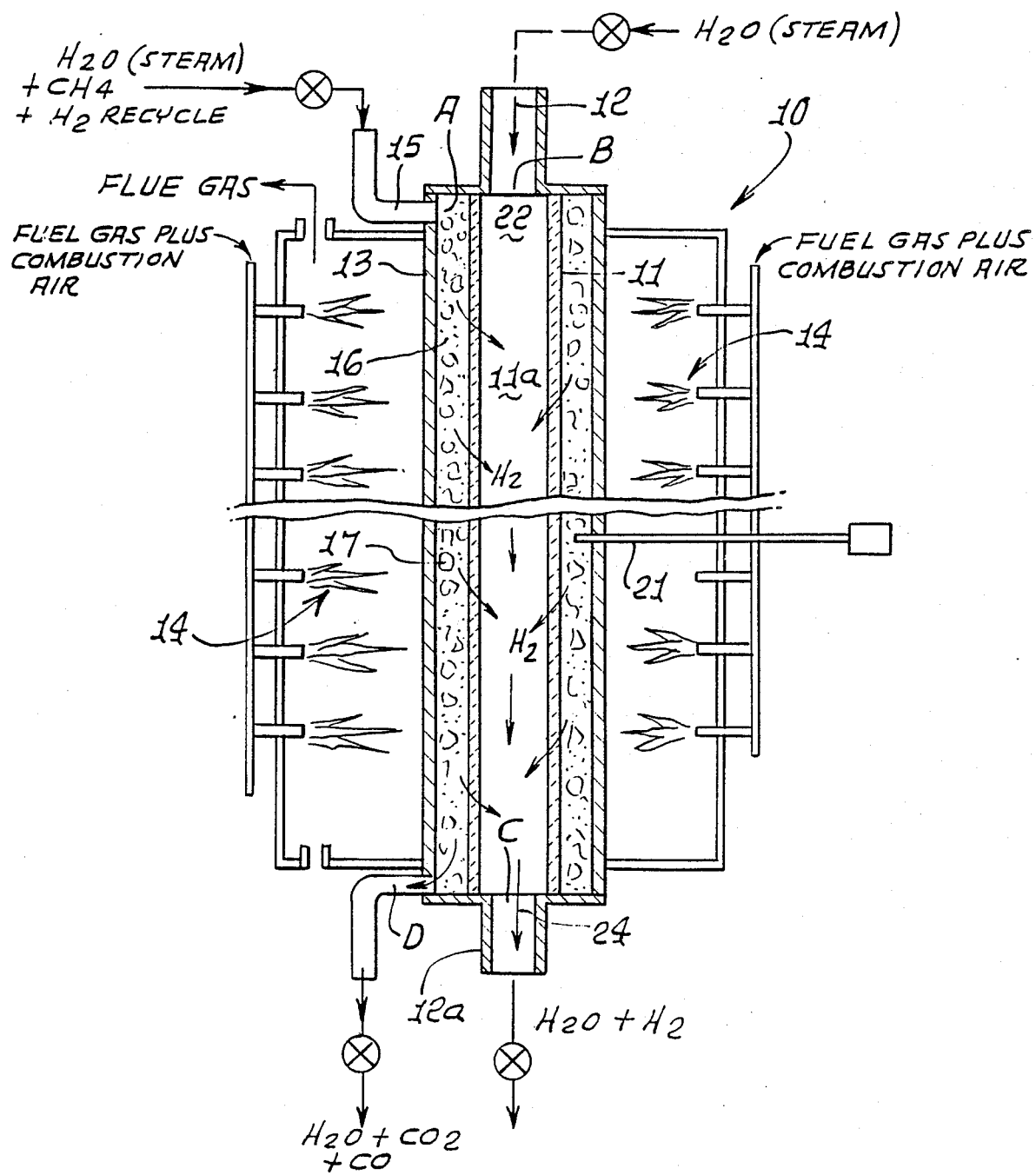

In FIG. 1, a reactor 10 employs a tubular, highly porous asymmetric ceramic membrane 11 treated with a catalytically active substance, such as nickel promoted with alkali metal salts. The membrane reactor is enclosed within a heated metallic tube 13, the whole assembly maintained at 300°–700°, as by gas burners 14.

The preheated reactor feed gas stream containing methane and steam in a 1:3 to 1:5 weight ratio, along with approximately 5 to 10% by volume hydrogen, is introduced through connection 15 at point A into the annulus 16 (which may be filled with pelleted catalyst, as shown) at a pressure ranging from 0.5 to 1,000 psia (or higher). Catalyst 17 (nickel metal promoted with alkali metal salts) is in the form of pellets or rings. Tube 13 containing the catalyst is formed from high alloy material, such as SS304, SS310, SS316, or the like.

The key element in the membrane reformer is the catalytic ceramic membrane tube 11 which has special characteristics as described in:

TABLE 2

| TYPICAL COMPOSITION OF CERAMIC MEMBRANE | | | |
|---|---|---|---|
| | Material | Pore Diameter | Thickness |
| Layer 1 | gamma alumina | 40 Ångstroms | 5 icrons |
| Layer 2 | alpha alumina | 0.2 microns | 30 microns |
| Layer 3 | alpha alumina | 0.8 microns | 50 microns |
| Support | alpha alumina | 10–15 microns | 1.5–20 millimeters | where $\gamma$ = gamma alumina; $\alpha$ = alpha alumina; Å = Angstroms; $\mu m$ = micron; and mm = millimeter The membrane is permeable to hydrogen and less (or not) permeable to methane, carbon oxides and steam. In addition, it is coated on its outside surface with the nickel or other suitable catalytic material. Steam is supplied to the interior of the membrane tube through connection 12 at point B. A pipe connection 12a, provides a conduit for the removal of the reaction products, primarily hydrogen and steam from the inner section of the membrane tube, at point D.

The reacting gas moves down through the reaction zone 16 maintained at temperature by heat flowing through the radiant wall of tube 13 at a rate determined by a temperature sensor 21 controlling the combustion of fuel at burners 14.

As the $CH_4$ and hydrogen flow moves down through the heated catalyst pellets in the annulus 16, the formation of hydrogen and carbon monoxide occurs. As methane and steam contact the surface of the membrane 11, additional chemical reaction occurs, forming $H_2$ and CO. Hydrogen preferentially diffuses through the membrane, leaving unconverted methane behind, along with carbon monoxide and carbon dioxide. Steam is supplied to the interior 22 of the membrane, at point B, diluting the hydrogen and inhibiting the diffusion of unreacted $CH_4$ and steam in the reaction zone 16 through the membrane.

The heat required for the reaction is provided by the combustion of fuel gas in the enclosing furnace. Because of the lower temperatures (300°–700° C.) required for the reactor, the overall efficiency of this system is significantly higher than that for a conventional reformer system, since less fuel is required to be burned to heat the radiant section (tube 13). In a conventional furnace, tubes are required to be heated to temperatures between 750° and 880° C.

Also, the invention permits the use of thinner tube 13 walls for the same feed gas pressure, or higher pressures for the same thickness walls, which results in significant process savings for applications requiring hydrogen-bearing gases at higher pressures, such as production of ammonia, methanol or hydrocracking of hydrocarbons.

The tube 13 itself is typically approximately four inches in external diameter, and is fitted with an internal ceramic membrane 11 from one to one and one-half inches in diameter. The overall length of such a tube is limited by mechanical considerations imposed by a safe and suitable design. For example, current commercial practice makes use of catalyst-filled high alloy tubes four inches in diameter and approximately thirty feet long. Due to the higher efficiency of the system described in this invention, the individual tubes can be shorter, i.e., about eight to fifteen feet in length.

As shown in FIG. 1, $H_2$ that has diffused through the membrane into the stream of steam within the interior 11a of the membrane leaves the latter via connector 24 at point C. A stream of $CO_2$ and $H_2O$ leaves zone 16 at point D. Points C and D are spaced lengthwise along the membrane from points A and B, as shown.

Figure 2:
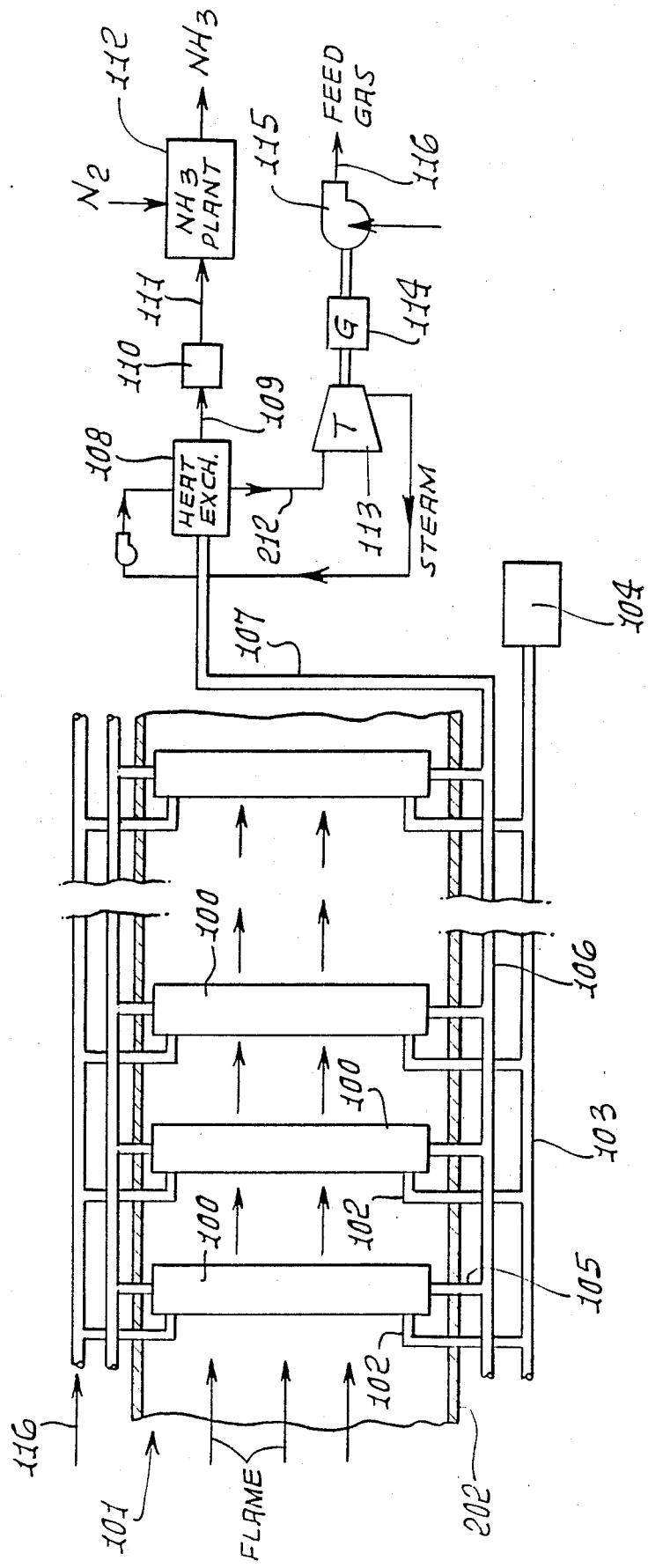

Referring now to FIG. 2, banks 100 of the reactors 10 are shown as located within a furnace 101 equipped with refractory brick walls 202 and fired either from the top, bottom or side depending upon the tubular arrangement, to raise the temperature of the reacting gas mass to 400° to 650° C. The reformed methane is collected through the exit tubes 102 ganged to headers 103 which conduct the high temperature gas to a waste heat recovery system 104 consisting of either a steam generator or a process gas preheater.

The hydrogen-containing stream, exiting from the reactors at 105, is passed via header 106 and duct 107 to heat exchanger 108. Cooled gas at 109 containing less than 5% to 10% methane by volume, is passed through a series of treatment steps at 110 to reduce the carbon dioxide carried within the gas by either adsorption (by molecular sieves or other suitable material) or by absorption utilizing an appropriate chemical solvent. In either case, the purified hydrogen is then delivered at 111 to the product use (for example ammonia plant 112) at a high level of purity.

The heat exchanger 108 serves to heat water to produce high pressure steam delivered at 212 to a steam turbine 113. The latter drives a generator 114, which in turn drives a compressor 115, for compressing the feed gas 116 ($CH_4$ and $H_2O$) delivered to the reactors, and at a high enough pressure for continuous conversion into hydrogen, as described, followed by conversion into ammonia. $H_2O$ may be removed from the $H_2$ stream before delivery to the ammonia plant.

In addition to the savings in the tubes, the radiant box efficiency for the present new furnace is significantly higher than the radiant box efficiency for conventional furnaces This is a direct result of the reduced temperature required to carry out the reforming reaction when using the catalytic ceramic membrane system. By having a maximum outlet temperature of the products of reforming of approximately 650° C., as compared with 850° C., for prior processes, the resultant closer approach of the flue gas temperature to the temperature of the walls in the reaction tubes produces an average radiant efficiency in the range of 65% to 80% for the new system, as compared with 45% to 60% in current practice. This means a material reduction in the quantity of fuel which must be fired simply to provide the sensible heat of the flue gas in order to obtain the necessary temperature for the reaction system.

The overall efficiency of the two furnaces involved is comparable, since this is essentially a function of the heat recovery surface located in the flue gas duct work. The quantity of steam generated by the duct work and exit process systems from the ceramic catalytic system is sufficient to provide the 2.5 to 3.5:1 ratio needed for complete reforming. In addition, because of the accelerated conversion obtained with the new system, the use of a lower quantity of steam is possible, leading to additional potential economic savings.

The present system also results in elimination of the requirement for a shift reactor, wherein carbon monoxide, which has been produced, will be converted into carbon dioxide and additional hydrogen. This is because the carbon monoxide formed as part of the steam reforming reaction remains in contact with steam in the catalytic body in the annulus surrounding the membrane and will be converted into hydrogen and carbon dioxide.

Additional usable feed stocks include methanol, ethanol, ethane, propane, butane and light petroleum fractions, other hydrocarbons having 1–4 carbon atoms in their chain molecules, and mixtures thereof.

The ceramic tube has the following physical characteristics:
composition: gamma and alpha alumina
porosity: 52–56%
pore volume: 0.4 cc/gram
density: 3.0 g/cc of solid alumina Between 5% and 20% weight percent nickel is typically added to the active surface of the ceramic material.

The process is also effective in the production of methanol and includes the steps:

(a) dehydrogenating a first stream of hydrocarbon and steam by diffusion of $H_2$ through a catalytic ceramic membrane at elevated temperature and pressure, (b) removing the diffused $H_2$ from the membrane in such a way as to produce an effective methanol synthesis gas with a molar ratio of hydrogen to carbon monoxide in the range of 2.0 to 2.5, (c) and converting the synthesis gas to methanol in a catalytic reactor in the absence of a synthesis gas compressor to deliver the synthesis gas to the methanol synthesis plant.

We claim:

1. The process for steam reforming of a hydrocarbon to produce $H_2$, CO and $CO_2$, that includes:
   (a) providing a generally tubular, porous, catalytic ceramic membrane, and providing a heated reaction zone in a container extending annularly about said membrane,
   (b) said membrane carrying a catalytically active metallic substance,
   (c) passing a first fluid stream of hydrocarbon and steam into said zone and into contact with one side of said catalytic ceramic membrane, to produce $CO_2$, CO and $H_2$,
   (d) and passing a second fluid stream comprising steam adjacent to said opposite side of said membrane in such manner as to promote hydrogen diffusion through said membrane from said one side to the opposite side thereof,
   (e) and removing hydrogen from said opposite side of said membrane in said second stream of steam,
   (f) maintaining a heated, porous catalytic bed extending lengthwise adjacent said membrane, in said zone, transferring heat into said bed lengthwise thereof and via said container, and passing said first stream into said bed for flow in contact with the bed and heating therein followed by first stream contact said one side of the membrane.

2. The process of claim 1 including removing $CO_2$, CO and $H_2O$ from said zone.

3. The process of claim 2 wherein
   (i) said first stream containing said hydrocarbon and steam is introduced to said reaction zone at a point A along the length of said catalytic ceramic membrane,
   (ii) said second stream containing steam is introduced into a region surrounded by the catalytic ceramic membrane at a point B along the length of said membrane,
   (iii) with the produced hydrogen being removed from the region at a point C along the length of said membrane, and
   (iv) and the produced CO, $CO_2$ and $H_2O$ being removed from said reaction zone at a point D along the length of said membrane,
   (v) wherein point A is juxtaposed relative to point B, point C is downstream of point B and point D is downstream of point A.

4. The process of claim 3 including locating said points C and D in spaced relation along the length of the membrane from said points A and B.

5. The process of claim 4 including locating said points A and B proximate same end of the tubular membrane.

6. The process of claim 1 wherein said hydrocarbon consists essentially of light hydrocarbons having 1–4 carbon atoms in each molecule.

7. The process of claim 1 wherein said first stream includes methane and steam in a 1:2 to 1:5 weight ratio.

8. The process of claim 7 wherein said first stream also includes 5% to 10% by volume hydrogen, and said first stream is at pressure between about 15 psia and about 2,000 psia.

9. The process of claim 1 wherein said catalytically active metallic substance consists essentially of nickel and alkali metal salt or salts.

10. The process of claim 1 including pellets of said catalytically active substance in said zone.

11. The process of claim 1 wherein said container consists of a stainless steel tube.

12. The process of claim 1 including maintaining said container at elevated temperatures sufficient to cause heat radiation from the container toward the ceramic tube, and a temperature or temperatures at the tube of between 300° and 750° C.

13. The process of claim 1 wherein said hydrocarbon is selected from the group that consists of
methane,
methanol,
ethane,
ethanol,
propane,
and butane.

14. The process of claim 3 including operating burners for transferring heat through said container into said bed, between said points A and D, said container being metallic and being maintained in contact with the bed, the bed consisting of pelleted catalyst.

* * * * *